United States Patent [19]
Russo et al.

[11] Patent Number: 5,574,826
[45] Date of Patent: Nov. 12, 1996

[54] MEMORY ORGANIZATION METHOD FOR A FUZZY LOGIC CONTROLLER AND CORRESPONDING DEVICE

[75] Inventors: Biagio Russo, Mascalucia; Claudio Luzzi, Aeri; Rinaldo Poluzzi, Milan, all of Italy

[73] Assignee: SGS-Thomson Microelectronics, S.r.l., Agrate Brianza, Italy

[21] Appl. No.: 257,340

[22] Filed: Jun. 9, 1994

[30] Foreign Application Priority Data

Jun. 9, 1993 [EP] European Pat. Off. ............... 93830251

[51] Int. Cl.$^6$ ............... G06G 7/00; G06F 17/00; G06F 9/44
[52] U.S. Cl. ................... 395/3; 395/61; 395/900
[58] Field of Search .................. 395/3, 61, 900

[56] References Cited

U.S. PATENT DOCUMENTS 5,287,432 2/1994 Tomitaka .................. 395/61

OTHER PUBLICATIONS

Patent Abstracts of Japan, vol. 016, No. 337 (P–1390), Jul. 22, 1992 & JP-A-04100153 (Yaskawa Electric Corp.), Apr. 2, 1992.

*Primary Examiner*—Robert W. Downs
*Assistant Examiner*—A. Katbab
*Attorney, Agent, or Firm*—David M. Driscoll; James H. Morris

[57] ABSTRACT

A method for setting up the memory of an electronic controller operates using fuzzy logic, whereby predetermined membership functions f(m) of logic variables M, defined within a universe of discourse sampled in a finite number of points m, are subjected to inference operations basically configured by IF/THEN rules with at least one front preposition and at least one rear implication. The controller includes a central control unit provided with a memory section for storing predetermined values of the membership functions f(m) which appear in the front or IF part of the fuzzy rules and have a predetermined degree of truth or membership. This method provides for storing into the memory section only the values of those membership functions f(m) which have a value of the degree of membership other than zero at the points m of the universe of discourse.

42 Claims, 5 Drawing Sheets

MEMORY ORGANIZATION METHOD FOR A FUZZY LOGIC CONTROLLER AND CORRESPONDING DEVICE

BACKGROUND OF THE INVENTION

1. Field of the Invention

This invention relates to a method for loading a memory of an electronic controller operating using fuzzy logic, and to an electronic controller operating in accordance with the method. More particularly, the invention relates to a method of loading a memory of an electronic controller operating using Fuzzy logic, whereby predetermined membership functions f(m) of logic variables M—defined within a so-called universe U of discourse sampled at a finite number of points m—are subjected to inference operations basically configured by IF/THEN rules with at least one front preposition and at least one rear implication. The controller also includes a central control unit provided with a memory section for storing predetermined values l of the membership functions f(m), which appear in the front or IF part of the fuzzy rules and have a predetermined degree G of truth or membership. The field of application of this invention is related to developments of artificial intelligence in connection with electronic data processing instruments based on a type of logic known as fuzzy logic.

2. Discussion of the Related Art

Fuzzy logic is winning acceptance as a technique which can provide solutions to a wide class of control problems, in relation to which such traditional techniques as those based on Boolean logic have failed to yield acceptable performance levels at a reasonable cost.

A clearer understanding of the invention calls for a brief discussion of the two principal methods of representing and modelling reality, i.e. of the types of mathematic models which can be used to define the terms of a given problem to solve. We refer in particular to those methods which are commonly used to solve problems with the aid of electronic computing instruments.

The first method provides a numerical/analytical description of reality, and is widely employed in engineering and scientific branches for all those applications where all the terms of a problem to be solved can be effectively identified. This method has had considerable influence on the architectures of current data processing instruments, but hardly suits those situations where the aspects of the problem tend to be "fuzzy" or difficult to identify, as may be the case with artificial intelligence applications.

In such situations, a modelling technique yielding a quantitative and qualitative description of the problem to be solved has proved to be the most effective, and it is there that the fuzzy logic can provide a body of rules for dealing with problems which involve uncertainty and imprecision as is typical of most human activities. In other words, fuzzy logic provides a method of modelling the "indefinite" reasoning that is typical of human mind, a reasoning which plays, however, an essential role in human ability to make decisions under conditions of uncertainty.

Fuzzy logic operates on a linguistic description of reality using a particular class of variables called language variables. The value of such variables may consist, for example, of words or phrases of any natural or artificial language. Basically, each variable is assigned a corresponding semantic meaning of the words or phrases which are used at the modelling stage of a given problem. In addition, a set of values may be associated syntactically to each variable, which are dependent on it and can take different meanings according to the context in which they are used. Such values are obtained from a primary term which represents the variable, an antonym thereof, and a series of so-called modifiers of the primary term. By way of example, assume that the name or notion "temperature" is taken to define the language variable M, and that the word "cold" is selected as a primary term for the variable M and the word "warm" as its antonym. To the primary term there may also be appended a series of so-called modifiers such as "not", "very", "more", "less", etc. (whence: not cold, very cold, colder, etc.) to complete the set of values of the variable, in an uncertain or non-univocal manner, but adequate for the peculiarities of fuzzy logic.

Each value assigned to a language variable is further represented by a so-called fuzzy set, namely a stochastic distribution function which ties each value of the variable within its corresponding domain of definition, also referred to as a universe of discourse, to a point in the range [0, 1] indicating the degree of truth or membership of the value considered. The functions which identify a fuzzy set in the universe of discourse are called membership functions f(m). For instance, a value of f(m)=0 would indicate that the point m is not a member of the fuzzy set identified by the function f, whereas a value of f(m)=1 would indicate that m is definitely a member of the fuzzy set. The aggregate of all the fuzzy sets of a language variable is called a term set.

Membership functions admit two different types of representations: an analytical representation and a vectorial representation. The former is tied to the universe of discourse and allows said domain to be mapped within a 0 to 1 range of values. The second type consists, on the other hand, of a vectorial sample representation of the membership function as obtained by splitting the universe of discourse into m points and the range [0, 1] into 1 levels.

Appropriate logic operations, called inference operations, may be carried out among the membership functions which enable to describe the performance of a system as the input parameters vary. These operations are carried out using fuzzy rules which, in general, obey to a syntax of the following type:

$$\text{IF } X \text{ IS } A, \text{ THEN } Y \text{ IS } B$$

where, X is the input value, A and B are membership functions f(m) which represent the system perception, and Y is the output value.

The part of the rules before the term THEN is called the "IF part" or front part, and that after the term THEN is called the "THEN part" or rear part of the inference rule.

Among the inference rules which can be applied to the membership functions of the language variables, a so-called weight function P can be defined which provides an indication of how well the input preposition X of the IF part of a rule matches the membership function A. That is, the degree of membership of X to A can be said to be the weight of the IF part of the rule, and that weight will affect the assignment of B to Y, which forms the THEN part of the rule. The various rules affecting all the fuzzy sets which characterize a language variable to be controlled will, therefore, be activated each with a weight of its own, and will proportionally affect the THEN parts, and therefore the output value from the electronic controller operating in fuzzy logic.

Electronic instruments for data processing which perform such operations must incorporate a specific architecture, specially dedicated for the set of inference operations which constitute the fuzzy logic computational model. By virtue of these computing devices operating according to a method of representing and modelling reality which is based on fuzzy logic, it has become possible to process purely abstract concepts analytically in a manner that closely resembles human reasoning, such as the term "room temperature", for example. However, an essential prerequisite to a satisfactory result is that the membership functions of the fuzzy set be sufficiently and correctly defined within the control device. In fact, the better that definition reflects the semantics of the fuzzy concept, the more correct the rate of occurrence of a term in a rule will be, whereby the output value from the electronic controller operating using fuzzy logic can track reality more closely.

The definition or setting up of membership functions which identify the fuzzy sets within a fuzzy logic-based electronic controller has represented, heretofore, a major factor which hindered both the development of new fuzzy logic applications and the verification of the theoretical potential of the method.

In fact, when membership functions should reflect, upon their hardware implementation, the semantics of a fuzzy concept, in order to obtain the proper rate of occurrence of a term in a rule, considerable storage space must be implemented, which only makes fuzzy logic advantageous for those applications where the term set of the language variable includes a relatively small number of membership functions.

A first remedy to this drawback is that of storing just some outstanding points of a membership function, specifically those where the function changes its gradient, thereby accomplishing a drastic reduction in the memory size. However, since the fuzzy device has to effect the joining of such points in order to proceed to the fuzzy computation proper, the computation of intermediate points is bound to draw substantially on the computation capacity. Furthermore, devices based on this method have a low level of flexibility because they operate on a limited number of predetermined membership function forms. Examples of such a device are a machine called the FP-3000, available from Omron Corporation or a machine called NLX-230, available from Neural Logix Corporation. These devices operate using digital technology representing the membership function in analytical form. The digital technology additionally allows the membership functions to be represented in vectorial form, to split the universe of discourse into a finite number of points and store the respective degrees of membership of the membership functions at those points.

Outstanding advantages of this technology are a good definition of the membership functions within the control device and the extreme computational simplicity it affords in the performance of the computation operations, that is, inferences of a fuzzy logic type. However, this high computation rate occupies a substantial amount of memory space due to the fact that each membership function requires that its values at all points of the universe of discourse have to be stored. Digital methods operating on a vectorial representation of the membership functions are known as Warp or Fulcrum methods.

SUMMARY OF THE INVENTION

The drawback of the prior art can be resolved by limiting the storage of the membership functions in correspondence to those points in the universe of discourse where the value of the degree of membership of the function is other than zero (not null).

Thus, one aspect of the present invention is a method for loading information into a memory section of an electronic controller which performs inference operations according to rules, each rule comprising at least one preposition and at least one implication, wherein a number of membership functions are defined for a finite number of points within a universe of discourse. The method involves providing values of the membership functions appearing in the preposition of at least one of the rules, each value being indicative of a degree of membership and storing in the memory section, for each of the finite number of points, the values of only those membership functions for the point which are not zero.

In one embodiment of this method, the point among the finite numbers of points which has a largest number of non-zero values is determined. A length of a memory word of the memory section is dependent on the point with the largest number of non-zero values. More particularly, the length L of said memory word is such that $L=nf(m)*(dim(G)+dim(f(m)))$, where $nf(m)$ is the largest number of non-zero values, $dim(G)$ is a word size required to represent a value indicative of a degree of membership, and $dim(f(m))$ is a word size required to represent the number of the membership functions. The largest number of non-zero values is typically between one to five, inclusive; often, the largest number of non-zero values is three.

In another embodiment of this method, the step of storing comprises storing, for each point of the finite number of points, a memory word comprising an indication of each the membership functions with a non-zero value for the point and the non-zero value. This step may involve, more particularly, the step of storing the memory word for said point such that the memory word is retrievable by applying an indication of the point to the memory section.

A second aspect of this invention is an electronic controller which comprises a central control unit and a memory section. The central control unit performs inference operations according to rules, each rule comprising at least one preposition and at least one implication, wherein a plurality of membership functions are defined for a finite number of points of a universe of discourse, each membership function having a value for each of the finite number of points, which value is indicative of a degree of membership, and wherein at least one of the rules has a preposition including one of the membership functions. The memory section stores values of the membership functions and is sized according to a number of nonzero values of the membership functions associated with a selected one of the finite number of points, the selected point having the largest number of nonzero values.

In one embodiment of this electronic controller, a length L of a memory word of the memory section may be dependent on the largest number of non-zero values. The length L of said memory word may be $L=nf(m)*(dim(G)+dim(f(m)))$, where $nf(m)$ is the largest number of non-zero values, $dim(G)$ is a word size required to represent a value indicative of a degree of membership, and $dim(f(m))$ is a word size required to represent the number of the membership functions. The number of non-zero values is typically between one to five, inclusive, and is often three.

A third aspect of this invention is an electronic controller, comprising a central control unit and a memory section. The central control unit performs inference operations according to rules, each rule comprising at least one preposition and at least one implication, wherein a plurality of membership functions are defined for a finite number of points of a universe of discourse, each membership function having a value for each of the finite number of points, which value is indicative of a degree of membership, and wherein at least one of the rules has a preposition including one of the membership functions. The memory section stores values of the membership functions and stores, for each point of the finite number of points, the values of only those membership functions of the point which are not zero.

In one embodiment of this electronic controller, the memory section stores, for each point of the finite number of points, a memory word comprising an indication of the membership functions with non-zero values for the point and said non-zero values. The memory word for a point may be stored in the memory section such that the memory word is retrievable by applying an indication of the point to an input of the memory section.

In another embodiment of this electronic controller, the memory section is sized according to the point of the finite numbers of points which has a largest number of non-zero values. The length L of a memory word of the memory section may be dependent on the largest number of non-zero values. More particularly, the length L of the memory word may be L=nf(m)*(dim(G)+dim(f(m))), where nf(m) is the largest number of non-zero values, dim(G) is a word size required to represent a value indicative of a degree of membership, and dim(f(m)) is a word size required to represent the number of the membership functions. The largest number of non-zero values is typically between one to five, inclusive and is often three.

A fourth aspect of the present invention is a memory section for an electronic controller. The electronic controller performs inference operations according to rules, each rule comprising at least one preposition and at least one implication, wherein a membership function, defined for a finite number of points of a universe of discourse, appears in the preposition of at least one of the rules, the membership function having a value for each of the finite number of points, which value is indicative of a degree of membership. The memory section stores for each point of the finite number of points the values of only those membership functions for the point which are not zero.

In one embodiment, this memory section stores, for each point of the finite number of points, a memory word comprising an indication of the membership functions with non-zero values for the point and the corresponding non-zero values. The memory word for said point may be stored such that the memory word is retrievable by applying an indication of the point to an input of the memory section.

In another embodiment, this memory section is sized according to which point of the finite numbers of points has a largest number of non-zero values. The length L of a memory word of the memory section thus may be dependent on the largest number of non-zero values. More particularly, the length L of said memory word may be L=nf(m)*(dim(G)+dim(f(m))), where nf(m) is the largest number of non-zero values, dim(G) is a word size required to represent a value indicative of a degree of membership, and dim(f(m)) is a word size required to represent the number of the membership functions. The largest number of non-zero values is typically between one to five, inclusive, and may be three.

A fifth aspect of this invention is a memory section for an electronic controller. The electronic controller performs inference operations according to rules, each rule comprising at least one preposition and at least one implication, wherein a membership function, defined for a finite number of points of a universe of discourse, appears in the preposition of at least one of the rules, the membership function having a value for each of the finite number of points, which value is indicative of a degree of membership. The memory section is sized according to a number of nonzero values of the membership functions associated with a selected one of the finite number of points, the selected point having the largest number of nonzero values.

In one embodiment of this memory section a length L of a memory word of said memory section is dependent on the largest number of non-zero values. The length L of said the word may be L=nf(m)*(dim(G)+dim(f(m))), where nf(m) is the largest number of non-zero values, dim(G) is a word size required to represent a value indicative of a degree of membership, and dim(f(m)) is a word size required to represent the number of the membership functions. The number of non-zero values is typically between one to five, inclusive, and is often three.

A sixth aspect of this invention is a method for using an electronic controller which includes a central control unit and a memory section. The central control unit performs inference operations according to rules, each rule comprising at least one preposition and at least one implication, wherein a plurality of membership functions are defined for a finite number of points of a universe of discourse, each membership function having a corresponding value for each of the finite number of points, which value is indicative of a degree of membership, and wherein at least one of the rules has a preposition including one of the membership functions. The memory section stores predetermined values of the membership functions and stores, for each of the finite number of points, an indication of and the value corresponding to only those membership functions for which the degree of membership of the point is not zero. The method involves receiving an input indicative of one of the finite number of points and obtaining from the memory the predetermined values of the membership function for the received point. A membership function is then selected and effective values of the membership functions are restored to extract predetermined weights involved in the rules which configure the inference operations.

In one embodiment of this method, the step of restoring involves comparing the selected membership function to the indications of the membership functions stored for the received point and outputting zero when an indication of the selected membership function is not stored for the received point.

In another embodiment of this method, the step of restoring comprises a step of comparing bits of a part $(w(f(m)_i))$ of the memory word output from said memory section related to the membership functions $(f(m)_i)$ with bits of a reference word $(w(f_{rij}))$ contained in a program memory in which the rules which configure the inference operations are stored. The step of comparing the part $(w(f(m)_i))$ of the memory word output from the memory section with bits of the reference word $(w(f_{rij}))$ from the program memory may obey the following logic relationship:

if $w(f_{rij})=w(f(m)_i)$ then weight=value $1_{f(m)i}$, and if $w(f_{rij}) \neq w(f(m)_i) \rightarrow$ weight=0, wherein weight is a value selected during the step of restoring, and $1_{f(m)i}$ is the value corresponding to the i-th membership function where it is a non-negative integer which performs inference operations according to rules, each rule comprising at least one preposition and at least one implication, wherein a plurality of membership functions are defined for a finite number of points of a universe of discourse, each membership function having a value for each of the finite number of points, which value is indicative of a degree of membership, and wherein at least one of the rules has a preposition including one of the membership functions.

A seventh aspect of the invention is an electronic controller, comprising means for receiving an input which indicates one of the finite number of points and a memory section. The memory section stores predetermined values of the membership functions and stores, for each of the finite number of points, an indication of and the value of only those membership functions for which the degree of membership of the point is not zero. It also includes a calculating section for performing the fuzzy logic inference operations and a buffer section, between the memory section and the calculating section, for regenerating effective values of the membership functions to extract predetermined weights involved in the rules which configure the inference operations.

In one embodiment of this electronic control device, the buffer section comprises a comparator having a first input for receiving an indication of a selected membership function from the central control unit and a second input connected to the output of the memory for receiving the indications of and the values of membership functions stored for the point indicated by the means for receiving and having an output which provides a zero output when the selected membership function is not indicated by the indications received from the memory.

In another embodiment of this electronic control device, the buffer section comprises a program memory, in which all the rules for the inference operations are stored, and having an output indicative of a membership function, and a comparator, for comparing bits of a part of the memory word output from the memory section and related to the membership functions, with bits of a reference memory word contained in the program memory. The comparator may be connected to the program memory through a micro-encoder which selects the reference words within the program memory. Alternatively, the comparator may have inputs connected to respective outputs of the IF memory section and the program memory, and is connected to the input of the calculating section.

The features and advantages of these aspects of the invention will become more apparent from the following description of an embodiment thereof given by way of illustration and not of limitation with reference to the accompanying drawing.

DETAILED DESCRIPTION

Figure 1:
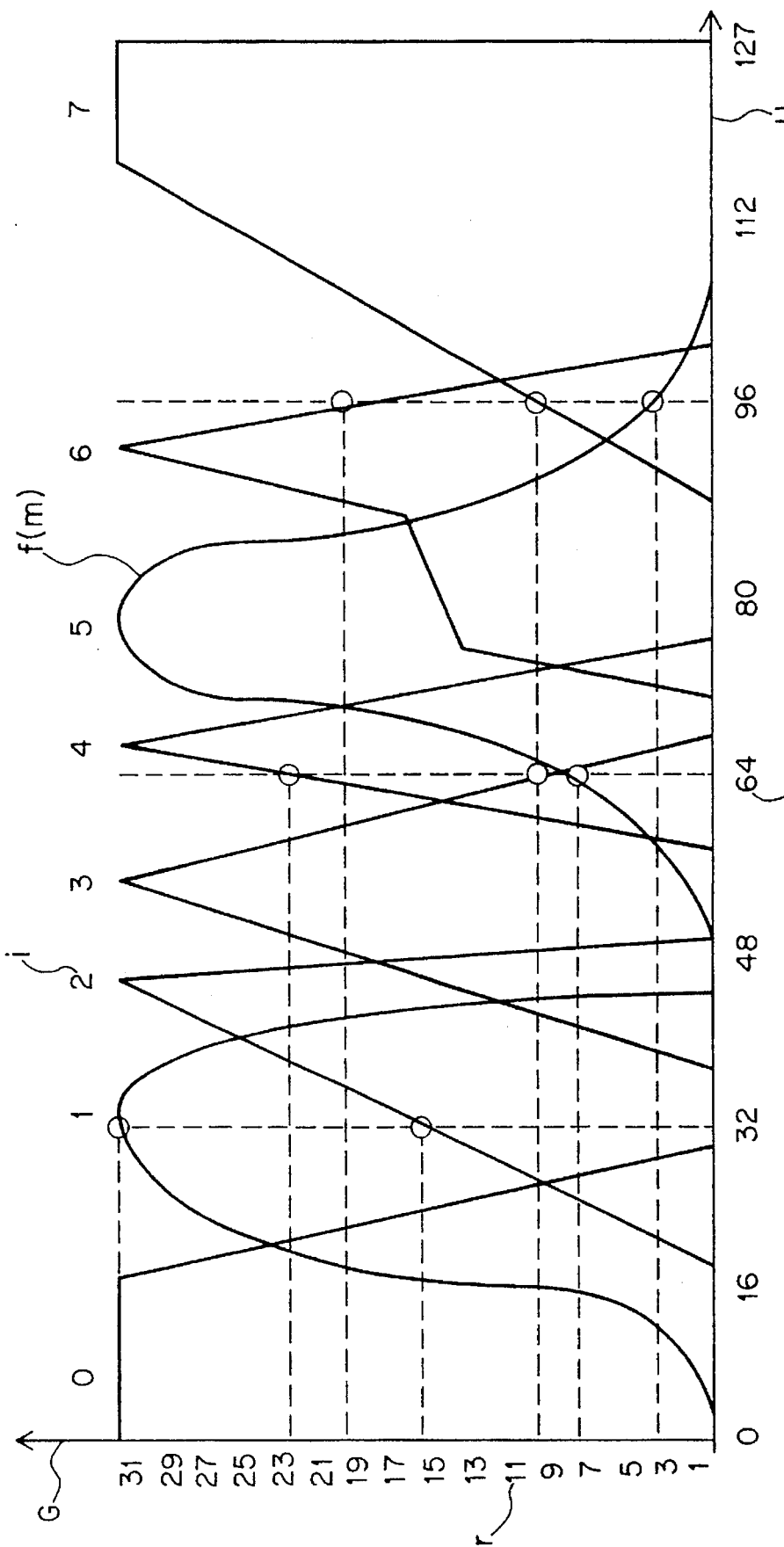
FIG. 1 shows diagrammatically a term set with a sampled universe of discourse and wherein the membership functions are represented in vectorial form.

With reference to FIG. 1, the term set of a language or logic variable M is represented by a vectorial system wherein the so-called universe U of discourse is plotted along the abscissa axis, and the degree G of truth or membership along the ordinate axis.

In such a case, the universe U of discourse and the degree G of membership are respectively sampled in one hundred and twenty eight points m and thirty two levels or values l. The term set is made up of eight membership functions $f(m)_i$ which identify, within the universe U of discourse, an equal number of fuzzy sets (i being the index of each membership function).

In FIG. 1, the membership functions f(m) have been numbered using indices i from zero to seven in increasing order from left to right. Taking, for instance, the point m=32 in the universe U of discourse, we get for the membership functions $f(32)_{0,3-7}$ a value l of the degree G of truth of zero, whilst for the membership function $f(32)_1$ we get a value of thirty one and for the function $f(32)_2$ a value of fifteen.

Coming back to the previously described example where the concept "temperature" is defined as the logic variable M, we can state that the term set shown in FIG. 1 is a visualization of the "temperature" variable in vectorial form.

A language variable of this type is ideally suited to mathematic modelling based on fuzzy logic.

An electronic control device designed for operation using fuzzy logic allows language variables of the type represented by the term set in FIG. 1 to be modelled accordingly.

Figure 2:
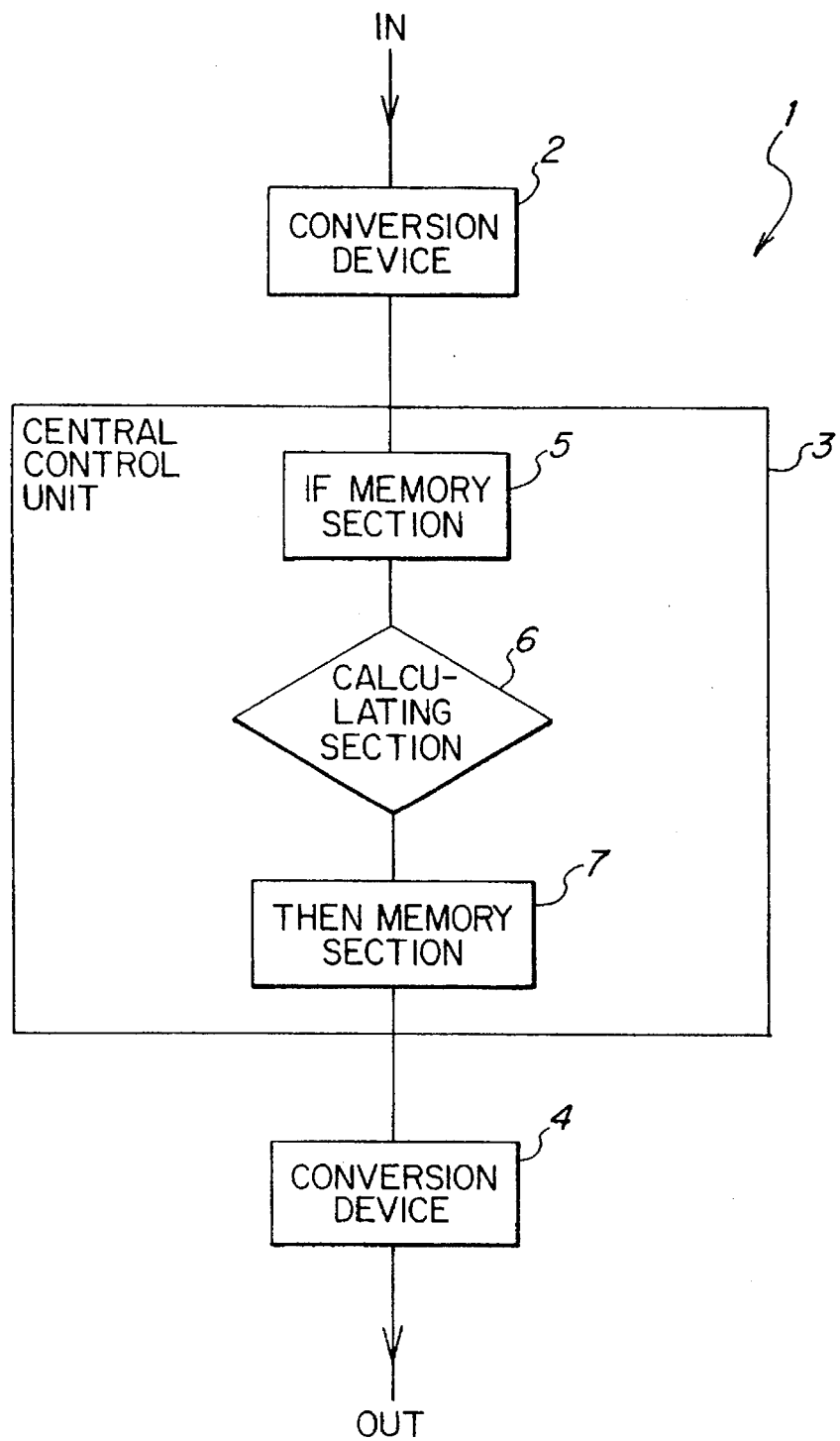
FIG. 2 shows a control device operating using fuzzy/ logic, according to the prior art.

With reference to FIG. 2, at 1 is generally and schematically shown an electronic control device according to the prior art. The controller 1 is basically an apparatus receiving an input signal IN corresponding to control physical variables, such as analog or digital signals from sensors, and performs predetermined fuzzy logic inference operations to output selected control signals OUT.

To this aim, the controller 1 has an input, or a plurality of inputs, IN and an output, or plurality of outputs, OUT. In the embodiment shown in FIG. 2, a single input and a single output have been preferred.

Each input IN is led to a corresponding conversion device (fuzzyfier) 2 operative to convert an input signal to logical information of the fuzzy type, that is, to a so-called membership function f(m).

The controller 1 further includes a central control unit 3 wherein the fuzzy logic membership functions f(m) are stored and fuzzy logic computation is also performed.

In particular, said central unit 3 has a memory section 5 (IF memory) for storing only those values related to the membership functions f(m) which appear in the left-hand portion of the fuzzy rules, and a memory section 7 (THEN memory) which only contains data related to the membership functions which appear in the right-hand portion of the fuzzy rules.

The memories may be of the PROM, or EPROM, or even of the RAM type. Provided between the two memory sections 5 and 7 is a calculating section 6 for carrying out the fuzzy logic inference operations.

The architecture of the controller 1 is completed by a conversion device 4 (defuzzyfier) effective to provide an appropriate interface between the controller 1 and the outside world.

The loading procedure into the memory section 5 of the prior-art controller 1, specifically in accordance with the aforesaid Warp method, will now be described with reference to FIG. 3.

Figure 3:
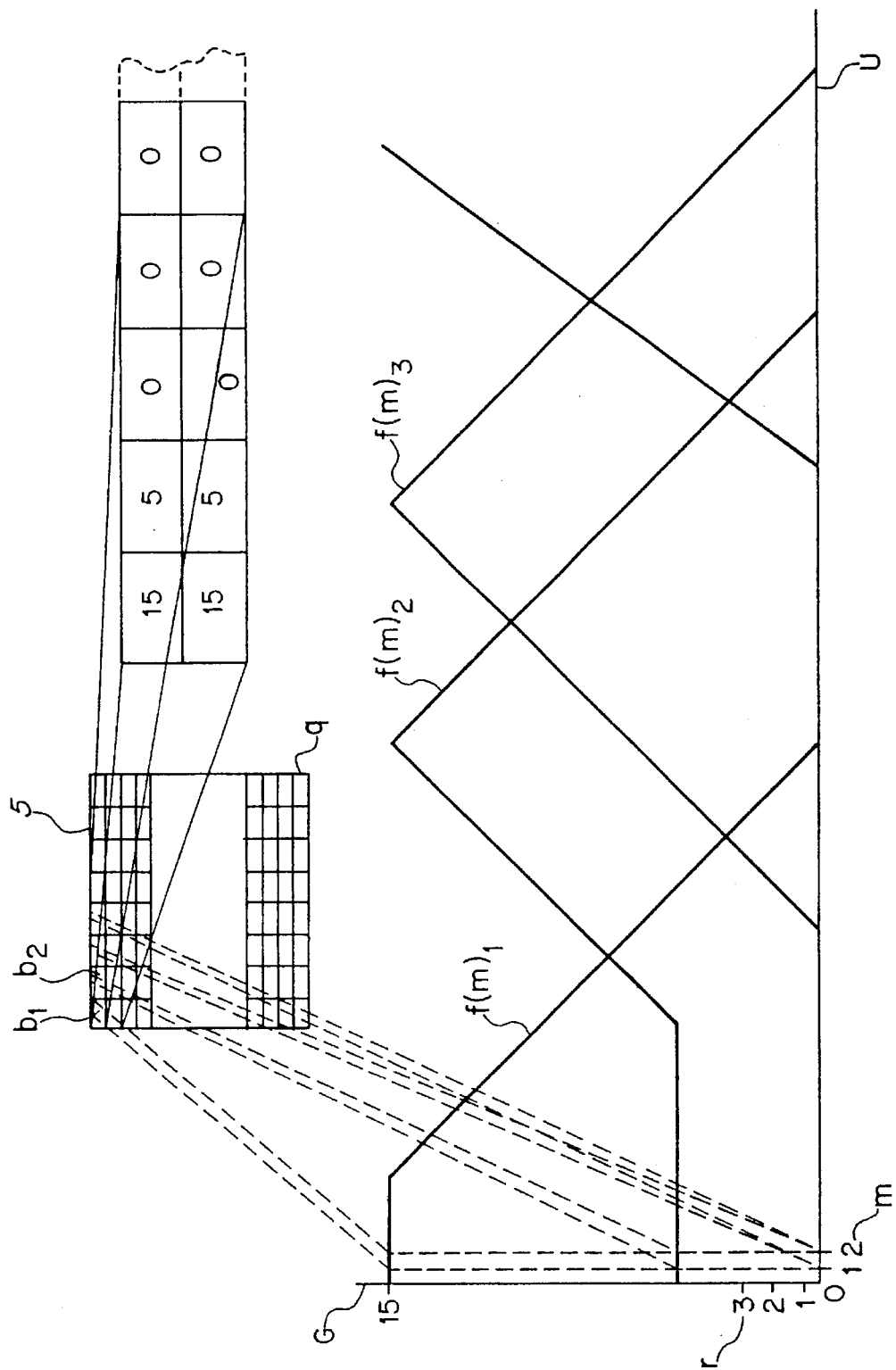
FIG. 3 illustrates diagrammatically the setting up of data in a term set, of the kind shown in FIG. 1, within the memory of a fuzzy controller as shown in FIG. 2.

In FIG. 3 there is shown diagrammatically, besides the IF memory 5, a term set similar to that shown in FIG. 1, which comprises eight membership functions $f(m)_i$ and a degree G of truth sampled in sixteen levels.

The memory 5 is loaded with all the information required for fuzzy logic computation which follows in the calculating section 6. Each line q of the memory 5 represents a well-defined point m in the universe U of discourse. The depth of the memory 5 depends on the sampling of the universe U of discourse; accordingly, when the universe U of disclosure is sampled in one hundred and twenty eight points m (like in the example of FIG. 1), the memory depth will be one hundred and twenty eight lines.

The information is stored (in binary code) by sequentially writing, into each line q of the memory 5, the value 1 of the degree G of truth of the eight membership functions f(m) at each given point m of the universe of discourse U. Thus, at the point m=1, we get the values 15/5/0/0/0/0/0/0, at the point m=2 the values 15/5/0/0/0/0/0/0, and so on. Each of these binary-coded lines constitutes a memory word.

The size of a memory word is determined by its length, namely the number of bits required to contain all the word information. In this specific case, with the degree of truth sampled in sixteen levels, four memory bits are needed for each membership function, for a total of thirty two bits.

In FIG. 3, the first four bits $b_1$ of the memory word represent the degree G of truth of the membership function $f(m)_1$, the next four bits $b_2$ the degree G of truth of the membership function $f(m)_2$, etc.

The size of the IF memory 5 is determined by its depth and by the length of the memory word. In the example of FIG. 3, this size will be 128*32 bits, while in the example of FIG. 1 (where a degree of truth sampled in thirty two levels corresponds to five bits), it will be 128*40 bits.

The prior-art storing method just described allows the electronic control device to operate at high computational rates and a good degree of resolution. However, a major drawback of that method resides, as we have seen, in the high memory space required for its implementation.

On the other hand, according to this invention, a novel method for setting up the memory of the electronic control device, to be described, enables the size of the memory to be drastically cut down for the same computational rate and degree of resolution.

This result is obtained, contrary to the teachings of the prior ark, by storing into each line q of the IF memory section 5 only the values l of those membership functions f(m) which have, at the points m of the universe U of discourse, a non-null (other-than-zero) value l of the degree G of membership.

In particular, the number of values l of the membership functions f(m) stored in said memory section 5 is determined according to the number of non-null values l of the membership functions f(m) at a predetermined point m of the universe U of discourse including the largest number of non-zero values.

Coming back to the term set of the example in FIG. 1, the largest number of non-null values l is three and locates, for example, at the points m=64 and m=96. For this term set, the number of values l of the membership functions f(m) that will be stored into each line of the memory is three, instead of eight of the prior art method.

Advantageously, the length of the memory word, i.e., its dimension, is arranged to be dependent on said maximum number of non-null values.

In a first preferred embodiment, the length of a word of the IF memory section 5 is defined as follows:

Word Length=$nf(m)*(dim(G)+dim(f(m)))$, where nf(m) is the number of non-null values at the point of the universe of discourse where this number is at a maximum;

dim(G) is the size of the word required to represent the aggregate of the values 1 of the degree G of truth; and dim(f(m)) is the size of the word required to represent the aggregate of the indices i of the membership functions f(m).

In the example of FIG. 1, the coefficient nf(m) is, as previously mentioned, three, the coefficient dim(G) is equal to five bits (G is sampled in thirty two levels), and the coefficient dim(f(m)) is equal to three bits (there are eight membership functions f(m)).

Substituting these values in the above cited definition, a word length of 3*(5+3)=24 bits is obtained, instead of forty bits of the prior art. The memory size will, therefore, be of 128*24 bits.

Thus, for a given sampling of the universe U of discourse, the size of the IF memory section 5, as optimized by the method just described, is much more compact than a memory size obtained by the prior art method.

The information which is written sequentially into each line of the memory section 5 comprises the membership functions $f(m)_i$ of non-null value which, in this specific example, would be at most three, accompanied by the corresponding value l of the membership degree G. For instance, at the point m=64 of the universe U of discourse, the word of the IF memory 5 would contain the following binary coded information: $f(64)_3,9$ / $f(64)_4,23$ / $f(64)_5,7$.

It can be appreciated that by this method of loading the memory, the information part related to membership functions with values l equal to zero would not be stored and would, therefore, go lost. In order to effect an appropriate extraction of the weights involved in the computation operations using fuzzy rules, an effective-value restoring step of all the membership functions in the term set is advantageously provided. In practice, the information issued from the IF memory section 5 is regenerated during the restoring step before moving to the calculation step. This restoring step comprises a comparison of the bits which represent that part of the word outgoing from said IF memory section 5 which is related to the membership functions $f(m)_i$, called $w(f(m)_i)$ for simplicity, and the bits of a reference word outgoing from a program memory wherein all the required fuzzy rules for the inference operations are stored, called $w(f_{rij})$ for simplicity. As noted above, $w(f(m)_i)$ may simply be an index i of each membership function $f(m)_i$. A controller cycles through suitable $w(f_{rij})$, which may be each possible value of i.

For a clearer explanation of the operations on which said restoring step is based, attention is directed to the example just discussed, wherein the word of the IF memory 5 at the point m=64 of the universe U of discourse U had been defined. If the bit of $w(f(64)_3)$ corresponds to the bit of $w(f_{rij})$, then the weight which will be entered into the calculation step should correspond to the value l=9 associated with said membership function. Conversely, if the bit of $w(f_{rij})$ does not correspond to any of the bits of $w(f(64)_{3,4,5})$, then the weight at the output of the restoring step should have a value of zero.

In a broad sense, it can be concluded that when the bits of $w(f_{rij})$ correspond to the bits of $w(f(m)_i)$, the selected weight will be the value 1 of the i-th membership function f(m), otherwise, said extracted weight will be zero. Stated in logic/mathematic language, this rule controlling the restoring step may be written as follows:

if $w(f_{rif})=w(f(m)_i) \rightarrow$ weight=value $1_{f(m)i}$, if $w(f_{rif}) \ne w(f(m)_i) \rightarrow$ weight=0, where:

weight means the value selected during the restoring step, and lf(m)i is the value (1) of the degree of truth (G) of the i-th membership function (f(m)).

Thus, through this restoring procedure, it is possible to regenerate all the required information for an appropriate fuzzy logic computation without in any way affecting the calculation rate of the electronic controller and the modelling resolution degree.

Figure 4:
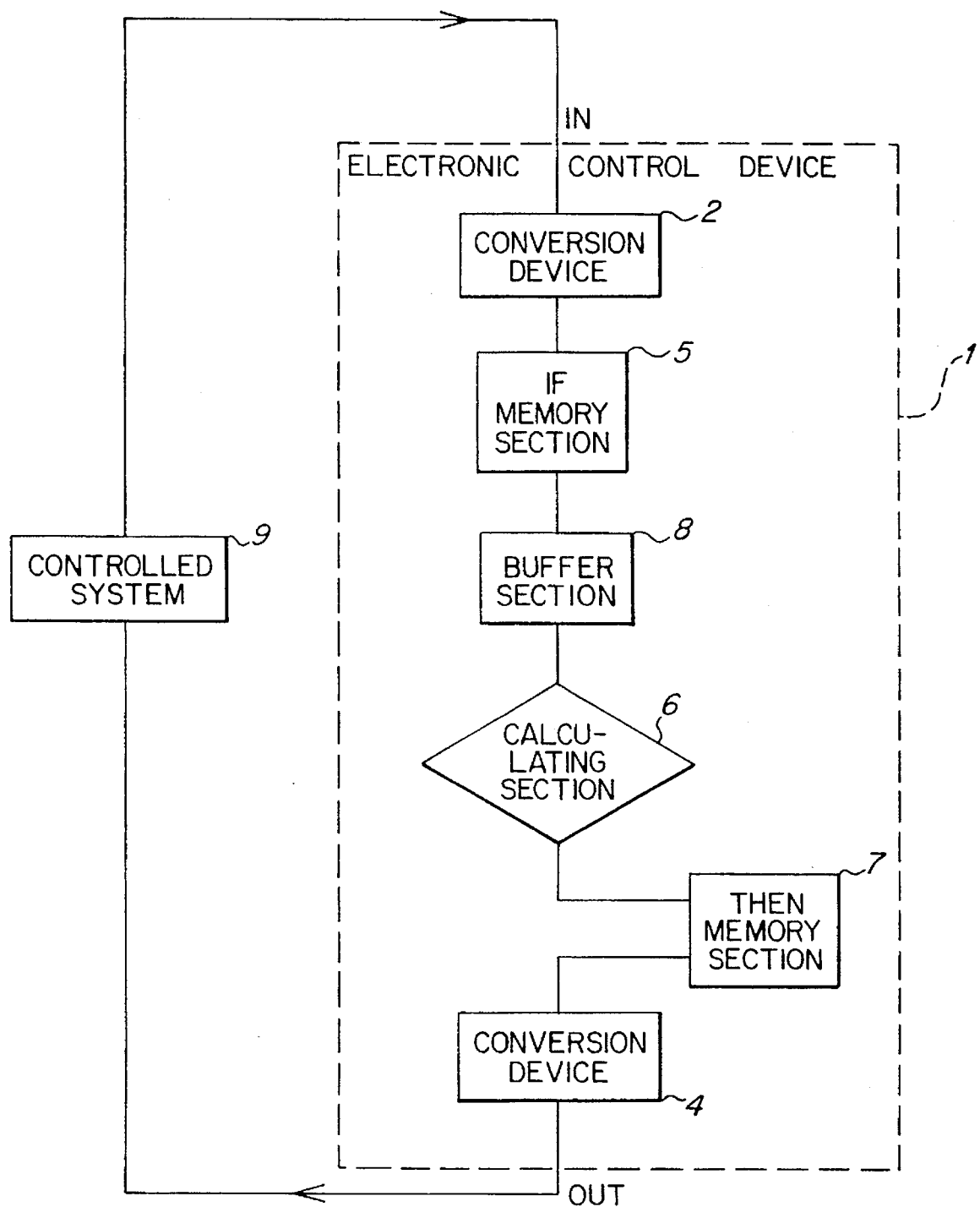
FIG. 4 is a general diagrammatic view of a feedback circuit incorporating a fuzzy controller according to the invention.

An example electronic control device operating in accordance with the present invention is shown in FIG. 4. Similar reference symbols denote parts of the device in common with the prior-art device in FIG. 2, and their description is not repeated.

Schematically shown at 9 is the system to be controlled.

The IF memory section 5A is now sized according to the number of the non-zero values of the membership functions f(m) at a predetermined point m of the universe U of discourse having the largest number of non-null values.

It has been found that in nearly all of the applications of fuzzy logic, the largest number of non-null values varies between one and five, and is three in most cases. Accordingly, the optimum size of the memory 5A will preferably have a word length of twenty four bits.

The fact that, using a word length of twenty four bits, no more than a certain number of non-null values at the various points m of the universe U of discourse can be used, is to be regarded as a merely apparent (and hence negligible) drawback of the device, since an electronic controller according to the invention can provide a good degree of resolution even when operating with a word length of the IF memory limited to just twenty four bits.

The electronic controller 1 of this invention advantageously includes a buffer section 8 interfacing the IF memory section 5A and the calculating section 6, to regenerate all the information required for proper computation using fuzzy logic.

Figure 5:
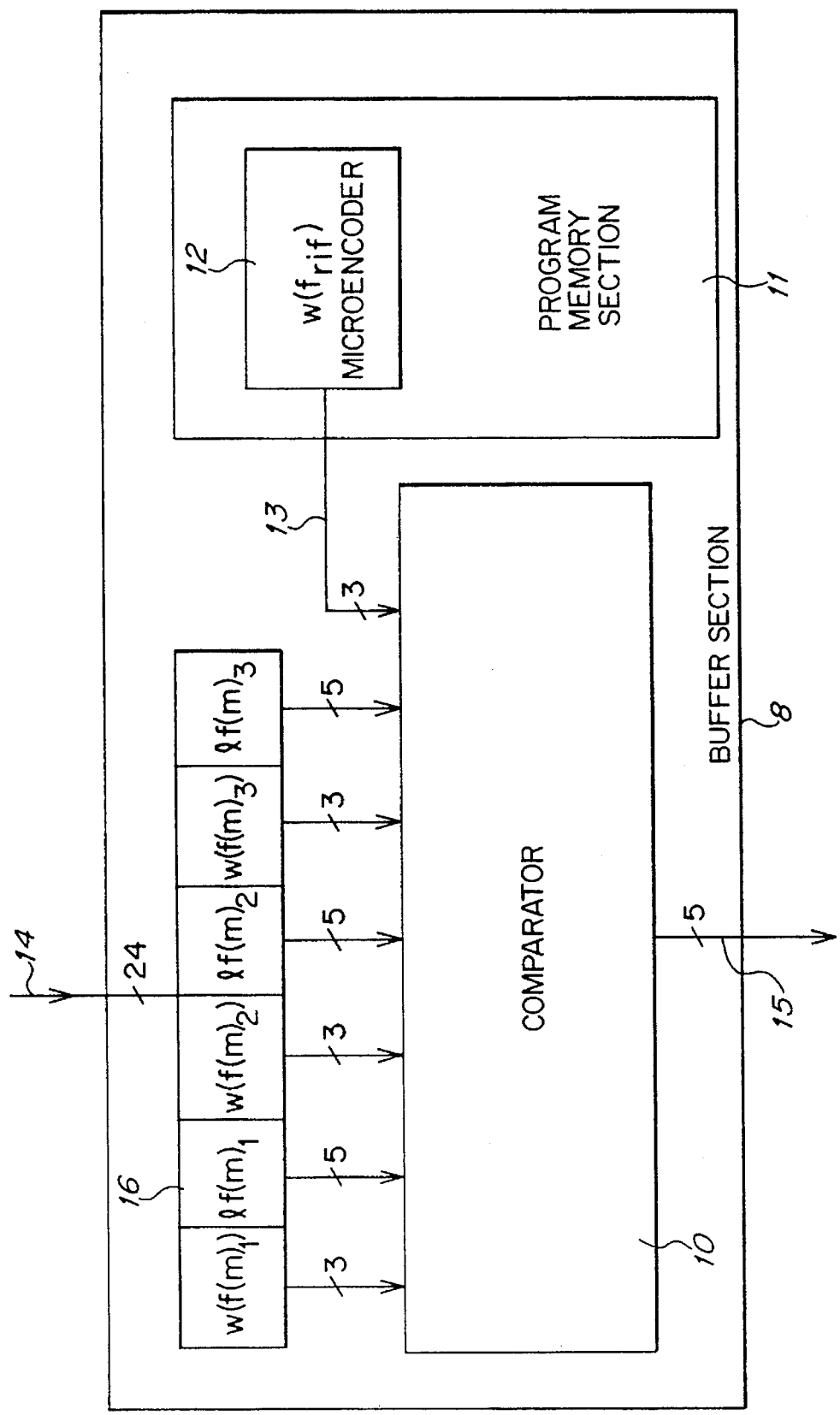
FIG. 5 is a diagrammatic detail view of the controller in FIG. 4.

This interfacing buffer section 8 is shown more in detail in FIG. 5, and mainly comprises a comparator 10 structured with a combinatory network, and a program memory section 11, also called "regenerative" for its function of regenerating or restoring of the effective values of the membership functions f(m). This program memory section 11 contains all the fuzzy rules required for the inference operations.

The program memory section 11 contains a micro-encoder 12 which selects, within the program memory section 11, the previously described reference words $w(f_{rif})$. Preferably, the program memory section 11 contains the index i of the membership functions f(m)$_i$ as the reference words $w(f_{rif})$. The program memory section 11 is addressed by a counter (not shown) driven by a data collection block (not shown) to sequentially generate addresses to the program memory section 11. The microencoder 12 controls the output of the program memory section 11 to provide the reference words $w(f_{rif})$. The output bus 13 of the micro-encoder 12 is connected to the comparator 10 input to provide $w(f_{rif})$.

The word from the memory section 5, as schematically shown at 16, is in turn presented at the input of the comparator 10, wherein the above restoring step is carried out. The extracted value or weight outgoing from the comparator 10 is then conveyed to the calculating section 6. The interconnection of the memory section 5 and the comparator 10 is provided by a twenty four wires bus 14, and the interconnection of the comparator 10 and the calculating section 6 is provided by the five wires bus 15.

One of the principal advantages afforded by the present method and its implementing device is that it is possible to drastically cut down the required memory capacity for hardware implementing the membership functions, while operating at a high computation rate and at a high degree of resolution.

Having now described a few embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A method for loading information into a memory section of an electronic controller which performs inference operations according to rules, each rule comprising at least one preposition and at least one implication, wherein a number of membership functions are defined for a finite number of points within a universe of discourse, the method comprising the steps of:

providing values of the membership functions appearing in the preposition of at least one of the rules, each value being indicative of a degree of membership; and storing in the memory section, for each of the finite number of points, the values of only those membership functions for the point which are not zero.

2. The method of claim 1, further comprising the step of determining which of the finite number of points has a largest number of non-zero values, and wherein the step of storing includes storing a memory word in the memory section, wherein a length of the memory word is dependent on the largest number of non-zero values.

3. The method of claim 2, further comprising the step of determining the length L of the memory word such that $L=nf(m)*(dim(G)+dim(f(m)))$, where nf(m) is the largest number of non-zero values, dim(G) is a word size required to represent a value indicative of a degree of membership, and dim(f(m)) is a word size required to represent the number of the membership functions.

4. The method of claim 3, wherein the largest number of non-zero values is between one to five, inclusive.

5. The method of claim 4, wherein the largest number of non-zero values is three.

6. The method of claim 1, wherein the step of storing comprises storing, for each point in the finite number of points, a memory word comprising an indication of each of the membership functions with a non-zero value for the point and the non-zero value.

7. The method of claim 6, wherein the step of storing a memory word for a point comprises the step of storing the memory word for the point such that the memory word is retrievable by applying an indication of the point to the memory section.

8. An electronic controller, comprising:

a central control unit which performs inference operations according to rules, each rule comprising at least one preposition and at least one implication, wherein a plurality of membership functions are defined for a finite number of points of a universe of discourse, each membership function having a value for each of the finite number of points, which value is indicative of a degree of membership, and wherein at least one of the rules has a preposition including one of the membership functions; and a memory section for storing values of the membership functions wherein the memory section has a size defined by a number of nonzero values of the membership functions associated with a selected one of the finite number of points, the selected point having the largest number of nonzero values.

9. The electronic controller of claim 8, wherein a length L of a memory word of the memory section is dependent on the largest number of non-zero values.

10. The electronic controller of claim 9, wherein the length L of the memory word is $$L=nf(m)*(dim(G)+dim(f(m)), \text{ where}$$

nf(m) is the largest number of non-zero values, dim(G) is a word size required to represent a value indicative of a degree of membership, and dim(f(m)) is a word size required to represent the number of the membership functions.

11. The electronic controller of claim 9 or 10, wherein the number of non-zero values is between one to five, inclusive.

12. The electronic controller of claim 11, wherein the number of non-zero values is three.

13. An electronic controller, comprising:

a central control unit which performs inference operations according to rules, each rule comprising at least one preposition and at least one implication, wherein a plurality of membership functions are defined for a finite number of points of a universe of discourse, each membership function having a value for each of the finite number of points, which value is indicative of a degree of membership, and wherein at least one of the rules has a preposition including one of the membership functions; and a memory section for storing values of the membership functions wherein the memory section stores, for each point of the finite number of points, the values of only those membership functions of the point which are not zero.

14. The electronic controller of claim 13, wherein the memory section stores, for each point of the finite number of points, a memory word comprising an indication of the membership functions with non-zero values for the point and the non-zero values.

15. The electronic controller of claim 14, wherein the memory word for the point is stored in the memory section such that the memory word is retrievable by applying an indication of the point to an input of the memory section.

16. The electronic controller of claim 13, wherein the memory section has a size defined by one of the finite numbers of points having a largest number of non-zero values.

17. The electronic controller of claim 16, wherein a length L of a memory word of the memory section is dependent on the largest number of non-zero values.

18. The electronic controller of claim 17, wherein the length L of the memory word is L=nf(m)*(dim(G)+dim(f(m)), where nf(m) is the largest number of non-zero values, dim(G) is a word size required to represent a value indicative of a degree of membership, and dim(f(m)) is a word size required to represent the number of the membership functions.

19. The electronic controller of claim 17 or 18, wherein the largest number of non-zero values is between one to five, inclusive.

20. The electronic controller of claim 19, wherein the largest number of non-zero values is three.

21. A memory section for an electronic controller which performs inference operations according to rules, each rule comprising at least one preposition and at least one implication, wherein a membership function, defined for a finite number of points of a universe of discourse, appears in the preposition of at least one of the rules, the membership function having a value for each of the finite number of points, which value is indicative of a degree of membership, wherein the memory section stores for each point of the finite number of points the values of only those membership functions for the point which are not zero.

22. The memory section of claim 21 which stores, for each point of the finite number of points, a memory word comprising an indication of the membership functions with non-zero values for the point and the corresponding non-zero values.

23. The memory section of claim 22, wherein the memory word for the point is stored such that the memory word is retrievable by applying an indication of the point to an input of the memory section.

24. The memory section of claim 21 having a size defined by which point of the finite numbers of points has a largest number of non-zero values.

25. The memory section of claim 24, wherein a length L of a memory word of the memory section is dependent on the largest number of non-zero values.

26. The memory section of claim 25, wherein the length L of the memory word is L=nf(m)*(dim(G)+dim(f(m)), where nf(m) is the largest number of non-zero values, dim(G) is a word size required to represent a value indicative of a degree of membership, and dim(f(m)) is a word size required to represent the number of the membership functions.

27. The memory section of claim 25 or 26, wherein the largest number of non-zero values is between one to five, inclusive.

28. The memory section of claim 27, wherein the largest number of non-zero values is three.

29. A memory section for an electronic controller which performs inference operations according to rules, each rule comprising at least one preposition and at least one implication, wherein a membership function, defined for a finite number of points of a universe of discourse, appears in the preposition of at least one of the rules, the membership function having a value for each of the finite number of points, which value is indicative of a degree of membership, wherein the memory section has a size defined by a number of nonzero values of the membership functions associated with a selected one of the finite number of points, the selected point having the largest number of nonzero values.

30. The memory section of claim 29, wherein a length L of a memory word of the memory section is dependent on the largest number of non-zero values.

31. The memory section of claim 30, wherein the length L of the memory word is L=nf(m)*(dim(G)+dim(f(m)), where nf(m) is the largest number of non-zero values, dim(G) is a word size required to represent a value indicative of a degree of membership, and dim(f(m)) is a word size required to represent the number of the membership functions.

32. The memory section of claim 30 or 31, wherein the number of non-zero values is between one to five, inclusive.

33. The memory section of claim 32, wherein the number of non-zero values is three.

34. A method for using an electronic controller which includes a central control unit which performs inference operations according to rules, each rule comprising at least one preposition and at least one implication, wherein a plurality of membership functions are defined for a finite number of points of a universe of discourse, each membership function having a corresponding value for each of the finite number of points, which value is indicative of a degree of membership, and wherein at least one of the rules has a preposition including one of the membership functions, and a memory section for storing predetermined values of the membership functions wherein the memory section stores, for each of the finite number of points, an indication of and the value corresponding to only those membership functions for which the degree of membership of the point is not zero, the method comprising the steps of:

receiving an input indicative of one of the finite number of points;

obtaining from the memory the predetermined non-zero values of the membership functions for the received point and identities of corresponding membership functions;

selecting a membership function; and restoring effective values of the membership functions from the obtained non-zero values and identities to extract predetermined weights involved in the rules which configure the inference operations.

35. The method of claim 34, wherein the step of restoring comprises the steps of:

comparing the selected membership function to the indications of the membership functions stored for the received point; and outputting zero when an indication of the selected membership function is not stored for the received point.

36. The method of claim 34, wherein the step of restoring comprises a step of comparing bits of a part $(w(f(m)_i))$ of the memory word output from the memory section related to the membership functions $(f(m)_i)$ with bits of a reference word $(w(f_{rij}))$ contained in a program memory in which the rules which configure the inference operations are stored.

37. The method of claim 36, wherein the step of comparing said part $(w(f(m)_i))$ of the memory word output from the memory section with bits of said reference word $(w(f_{rij}))$ from said program memory obeys the following logic relationship:

if $w(f_{rij})=w(f(m)_i)$ then weight=value $1_{f(m)i}$, and if $w(f_{rij}) \neq w(f(m)_i)$ then weight=0, wherein weight is a value selected during the step of restoring, and $1_{f(m)i}$ is a value corresponding to an i-th membership function where i is a non-negative integer.

38. An electronic controller, comprising:

means for receiving an input which indicates one of a finite number of points;

a memory section for storing predetermined values of the membership functions wherein the memory section stores, for each of the finite number of points, an indication of and the value of only those membership functions for which the degree of membership of the point is not zero;

a calculating section for performing the fuzzy logic inference operations; and a buffer section, between the memory section and the calculating section, for regenerating effective values of the membership functions to extract predetermined weights involved in the rules which configure the inference operations.

39. The electronic control device of claim 38, wherein the buffer section comprises a comparator having a first input for receiving an indication of a selected membership function from the central control unit and a second input connected to the output of the memory for receiving the indications of and the values of membership functions stored for the point indicated by the means for receiving and having an output which provides a zero output when the selected membership function is not indicated by the indications received from the memory.

40. An electronic control device of claim 38, wherein the buffer section comprises a program memory, in which all the rules for the inference operations are stored, and having an output indicative of a membership function; and a comparator, for comparing bits of a part of the memory word output from the memory section and related to the membership functions, with bits of a reference memory word contained in the program memory.

41. The electronic control device of claim 40, wherein the comparator is connected to the program memory through a micro-encoder which selects the reference words within the program memory.

42. The electronic control device of claim 40, wherein the comparator has inputs connected to respective outputs of the memory section and the program memory, and is connected to the input of the calculating section.

* * * * *

UNITED STATES PATENT AND TRADEMARK OFFICE
CERTIFICATE OF CORRECTION

PATENT NO. : 5,574,826
DATED : November 12, 1996
INVENTOR(S) : Biagio Russo, Claudio Luzzi, and Rinaldo Poluzzi It is certified that error appears in the above-identified patent and that said Letters Patent is hereby corrected as shown below:

Column 6,
Line 61, should read as folows:
-- if $w(f_{rif}) \neq w(f(m)_i) \rightarrow$ weight=0, --

Column 11,
Line 7, should read as follows:
-- if $w(f_{rif}) \neq w(f(m)_i) \rightarrow$ weight=0, where: --

Signed and Sealed this

First Day of January, 2002

Attest:

Attesting Officer

JAMES E. ROGAN
Director of the United States Patent and Trademark Office